(12) United States Patent
Yamaguchi

(10) Patent No.: US 7,043,735 B2
(45) Date of Patent: May 9, 2006

(54) SYSTEM AND METHOD TO DYNAMICALLY SELECT AND LOCATE SERVER OBJECTS BASED ON VERSION INFORMATION OF THE SERVER OBJECTS

(75) Inventor: Toshio Yamaguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 575 days.

(21) Appl. No.: 09/873,362

(22) Filed: Jun. 5, 2001

(65) Prior Publication Data
US 2002/0049866 A1    Apr. 25, 2002

(30) Foreign Application Priority Data
Jun. 8, 2000   (JP)   ............................... 2000-172204

(51) Int. Cl.
*G06F 9/00* (2006.01)
(52) U.S. Cl. ...................................... 719/316; 717/170
(58) Field of Classification Search ................ 709/316, 709/200–203, 217–219; 717/170, 168, 169, 717/171, 172; 719/314, 315, 316, 317, 313
See application file for complete search history.

(56) References Cited

U.S. PATENT DOCUMENTS

| | | | | |
|---|---|---|---|---|
| 5,586,304 A | * | 12/1996 | Stupek et al. | ................ 717/170 |
| 5,608,865 A | * | 3/1997 | Midgely et al. | ................ 714/1 |
| 5,809,287 A | * | 9/1998 | Stupek et al. | .................. 703/22 |
| 5,828,847 A | * | 10/1998 | Gehr et al. | ................... 709/239 |
| 5,897,658 A | * | 4/1999 | Eskesen et al. | .............. 711/152 |
| 6,052,531 A | * | 4/2000 | Waldin et al. | ............... 717/170 |
| 6,074,434 A | * | 6/2000 | Cole et al. | .................... 717/173 |
| 6,253,230 B1 | * | 6/2001 | Couland et al. | ............. 709/203 |
| 6,263,368 B1 | * | 7/2001 | Martin | ........................ 709/224 |
| 6,282,712 B1 | * | 8/2001 | Davis et al. | ................. 717/170 |
| 6,336,171 B1 | * | 1/2002 | Coskrey, IV | ................. 711/152 |

(Continued)

FOREIGN PATENT DOCUMENTS

JP      A-11-154138       8/1999

OTHER PUBLICATIONS

"Java Naming and Directory Interface Application Programming Interface", Sun Microsystems, Inc., JNDI 1.2/Java 2 Platform, Standard Edition, v. 1.3, Jul. 14, 1999.

*Primary Examiner*—John Follansbee
*Assistant Examiner*—Haresh Patel
(74) *Attorney, Agent, or Firm*—Mattingly, Stanger, Malur & Brundidge, P.C.

(57) ABSTRACT

A distributed object management method and system, and a recording medium for recording a processing program of the method and the system are disclosed. According to this method, a server object can be changed in operation. The method for managing objects in a distributed object environment includes steps of requesting server object information of server objects to be accessed, selecting and supplying a requester with server object information of the newest one of requested server objects, accessing the server object indicated in the server object supplied, and performing processing requested by the access.

5 Claims, 8 Drawing Sheets

U.S. PATENT DOCUMENTS

| | | |
|---|---|---|
| 6,425,126 B1 * | 7/2002 | Branson et al. ............. 717/168 |
| 6,453,468 B1 * | 9/2002 | D'Souza .................... 717/168 |
| 6,480,893 B1 * | 11/2002 | Kriegsman ................. 709/226 |
| 6,493,768 B1 * | 12/2002 | Boutcher ................... 719/330 |
| 6,523,130 B1 * | 2/2003 | Hickman et al. ............ 714/4 |
| 6,532,451 B1 * | 3/2003 | Schell et al. ................ 705/54 |
| 6,643,704 B1 * | 11/2003 | Timms et al. ............... 709/239 |
| 6,681,389 B1 * | 1/2004 | Engel et al. ................ 717/173 |
| 6,681,390 B1 * | 1/2004 | Fiske ........................ 717/173 |
| 6,691,165 B1 * | 2/2004 | Bruck et al. ................ 709/227 |
| 2002/0010783 A1 * | 1/2002 | Primak et al. .............. 709/228 |
| 2004/0215709 A1 * | 10/2004 | Basani et al. ............... 709/201 |

\* cited by examiner

SERVER OBJECT REGISTRATION INFORMATION

SERVER OBJECT MANAGEMENT INFORMATION

SYSTEM AND METHOD TO DYNAMICALLY SELECT AND LOCATE SERVER OBJECTS BASED ON VERSION INFORMATION OF THE SERVER OBJECTS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to a distributed object management system for managing objects in a distributed object environment, and more specifically to dynamically selecting and locating server objects, in a distributed object environment, based on version information of the server objects.

2. Description of the Related Art

In a distributed object environment for executing a backbone job, demand is now high for realizing operation around the clock for 365 days a year. In such a distributed object environment operated continuously, it is indispensable to carry out the change of a server object, if required, in a dynamic way.

For the version-up of a server object, for example, JP-A-11-154138 describes a method in which a server has a backup file of a load module so that the internal information of the load module and the internal information of the backup file of the server to be started are checked at the time of start up.

In the conventional distributed object environment described above, even in the case where a new server object is started to provide the same service as other server objects, it is difficult to carry out the change while a plurality of the server objects are in operation as long as the object name or the interface of the new server object remains unchanged in view of the fact that a plurality of server objects providing the same service are considered to be equivalent to each other.

Another problem of the method described in JP-A-11-154138 is that in the case where a version-up is required, the start-up is notified to clients as a failure, and therefore the service is interrupted. Further, in the distributed object environment, a problem is posed that version consistency fails to be considered between a plurality of server objects which may be operated in collaboration with each other.

In the case where the service of a server object is provided continuously or a plurality of server objects are operated in collaboration with each other in a distributed object environment, therefore, it is necessary that a server object can be changed while retaining consistency between the server objects in operation.

BRIEF SUMMARY OF THE INVENTION

The object of the present invention is to solve the problems described above, and to provide a technique capable of changing a server object in operation.

According to one aspect of the invention, there is provided a distributed object management system for managing objects in a distributed object environment, wherein in the case where the server object information is requested, the server object information of the newest server object based on change information is supplied to the requester to enable the newest server object to be accessed. In this way, the server object accessed is changed from an old one to the newest one.

According to another aspect of the invention, there is provided a distributed object management system, wherein the change information indicating the newness of the server object is held, and the change of a given server object is identified by determining the difference of this change information, thereby making it possible to change an object in operation.

According to still another aspect of the invention, in the case where a requester client object or a server object requests the server object information of a server object or another server object, as the case may be, to be accessed, the change information of the requested server objects are checked, so that the newest one of the server objects is selected and the server object information of the particular server object is supplied to the requester.

The requester that has received the server object information of the newest server object accesses the server object indicated in the supplied server object information and requests the execution of the processing thereof. The server object thus accessed executes the requested processing.

In the case where there exist a plurality of server objects having the same server object name or the same interface identification information, the change information of these server objects are compared with each other, and the server object having old change information is canceled.

As described above, with a distributed object management system according to this invention, in the case where the server object information is requested, the server object information of the newest server object is supplied to the requester to enable the newest server object to be accessed. In this way, the server object accessed is changed from an old one to the newest one. Therefore, a server object can be changed in operation.

DETAILED DESCRIPTION OF THE INVENTION

An explanation will be given below of a distributed object management system according to an embodiment of the invention, in which an object is changed in operation.

Figure 1:
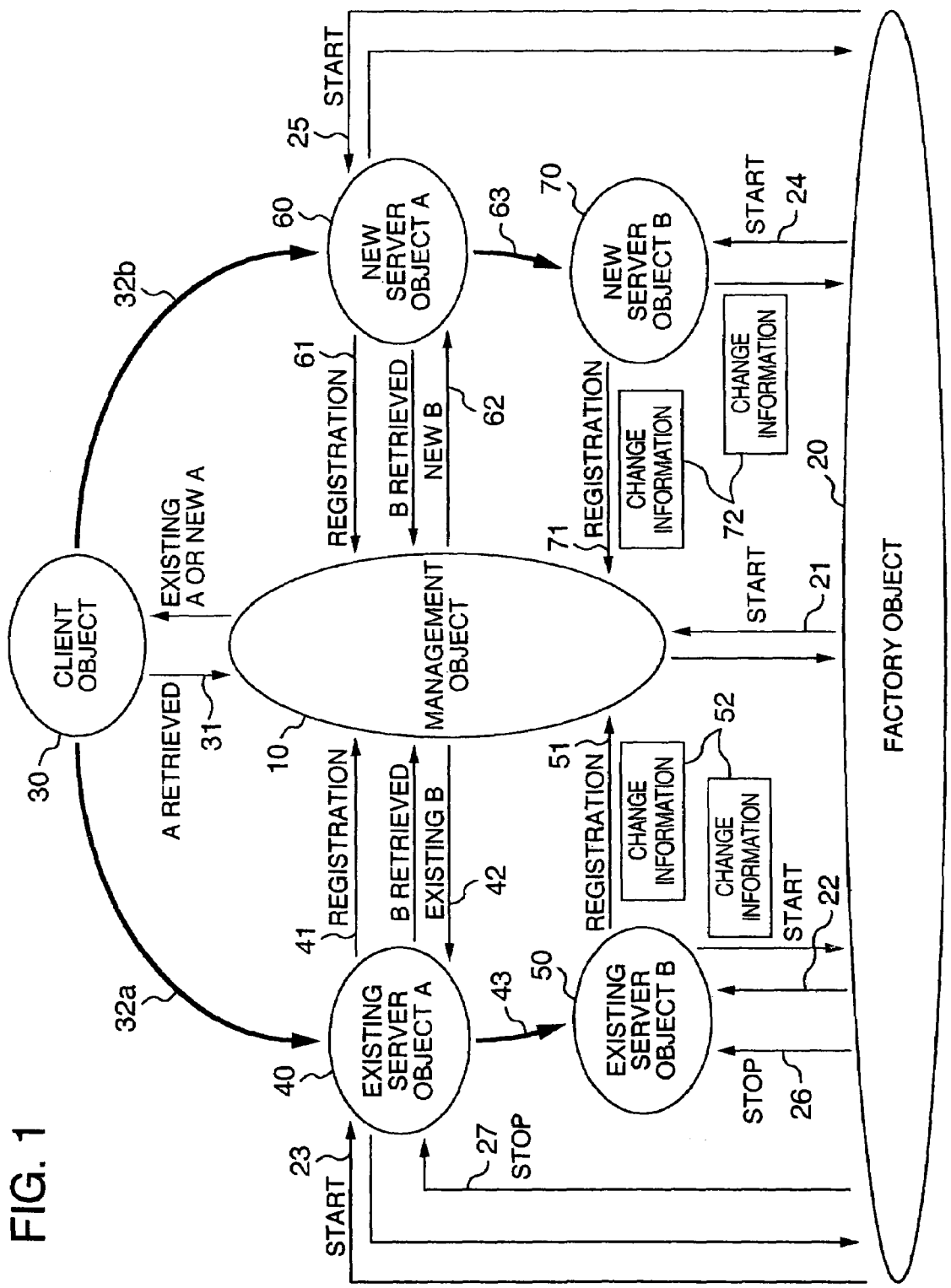
FIG. 1 is a diagram showing a configuration of a distributed system according to an embodiment of the invention.

FIG. 1 is a diagram showing a configuration of a distributed system according to this embodiment. As shown in FIG. 1, the distributed system according to this embodiment comprises a management object 10, a factory object 20, a client object 30, an existing server object A 40, an existing server object B 50 accessed by the existing server object A 40, a new server object A 60 started after the factory object 20 to change the existing server object A 40 and the existing server object B 50, a new server object B 70, change information 52 delivered to the management object 10 and the factory object 20 upon start (23) and registration (41) of the existing server object A 40, and change information 72 delivered to the management object 10 and the factory object 20 upon start (24) and registration (71) of the new server object B 70. The objects are executed by different information processing systems, respectively, and communicate with each other through a network to transmit/receive information associated with start/stop instructions, registration and retrieval.

In the distributed system according to this embodiment, assume that the process for the server object A and the server object B is carried out in response to the access from the client object 30. First, the factory object 20 starts (21) the management object 10, starts (22) the existing server object B 50 and starts (23) the existing server object A 40. The factory object 20 starts the existing server object B 50 and the existing server object A 40 in that order, i.e. in the predefined reverse order of access to the server objects.

The existing server object A 40 and the existing server object B 50, once started by the factory object 20, send the server object information to the management object 10. The positional information such as an IP (internet protocol) address indicating the position, the ID information including the name of the server object and indicating the interface, and the change information indicating the newness of the server objects are registered in the management object 10. The change information includes the revision information, etc. for determining the newness of a plurality of the server objects providing the same service and is arbitrary information that can be determined in this particular distributed system. In the case where a given server object has no function to transmit the change information, the management object 10 registers information such as the present time of registration of the particular server object as change information.

Now, an explanation will be given of the operation for executing the client object 30 in the distributed system of this configuration. The client object 30 requests the management object 10 to acquire the server object information of the server object A accessed by the client object 30.

The management object 10, upon receipt of the request from the client object 30 to acquire the server object information of the server object A, retrieves the server object information of the server object A, acquires the server object information of the existing server object A 40 already started as a server object A and supplies it to the requester client object 30 (31).

The client object 30, upon receipt of the server object information of the existing server object A 40 from the management object 10, accesses the existing server object A 40 using the particular server object information (32a).

The existing server object A 40 accessed by the client object 30 requests the management object 10 to acquire the server object information of the server object B accessed by the existing server object A 40.

Upon receipt of the request from the existing server object A 40 to acquire the server object information of the server object B, the management object 10 retrieves the server object information of the server object B, acquires the server object information of the existing server object B 50 already started as a server object B and supplies it to the requester existing server object A 40 (42).

The existing server object A 40 supplied with the server object information of the existing server object B 50 from the management object 10 accesses the existing server object B 50 using the particular server object information (43), and carries out the processing requested by the client object 30.

In the distributed system according to this embodiment, assume that the existing server object A 40 and the existing server object B 50 are to be changed. A new server object B 70 is started (24) and a new server object A 60 is started (25) by the factory object 20. The factory object 20 starts the new server object B 70 and the new server object A 60 in that order, i.e. in the order reverse to the predefined order of access of the server objects.

In the case where the client object 30 is executed in this distributed system of a new configuration, as in the previous case, the client object 30 requests the management object 10 to acquire the server object information of the sever object A accessed by the client object 30.

The management object 10, upon receipt of the request from the client object 30 to acquire the server object information of the server object A, retrieves the server object information of the server object A, compares the change information of the existing server object A 40 already started as a server object A with that of the new server object A 60, acquires the server object information of the new server object A 60 providing a new server object A and supplies it to the requester client object 30 (31).

The client object 30, upon receipt of the server object information of the new server object A 60 from the management object 10, accesses the new server object A 60 using the particular server object information (32b).

The new server object A 60 accessed by the client object 30 requests the management object 10 to acquire the server object information of the server object B accessed by the new server object A 60.

The management object 10, upon receipt of the request from the new server object A 60 to acquire the server object information of the server object B, retrieves the server object information of the server object B, compares the change information of the existing server object B 50 already started as a server object B with that of the new server object B 70, acquires the server object information of the new server object B 70 providing the new server object B, and supplies it to the requester new server object A 60 (62).

The new server object A 60 supplied with the server object information of the new server object B 70 from the management object 10 accesses the new server object B 70 using the particular server object information (63), and performs the process requested by the client object 30.

Also, in the distributed system of the new configuration, once the new server object A 60 and the new server object B 70 are started, the factory object 20 stops the existing server object B 50 (26) and the existing server object A 40 (27) as soon as the processes under execution by the existing server object B 50 and the existing server object A 40 are completed. The factory object 20 stops the existing server object B 50 and the existing server object A 40 in that order, i.e. in the predefined order reverse to the order of access of the server objects.

Figure 2:
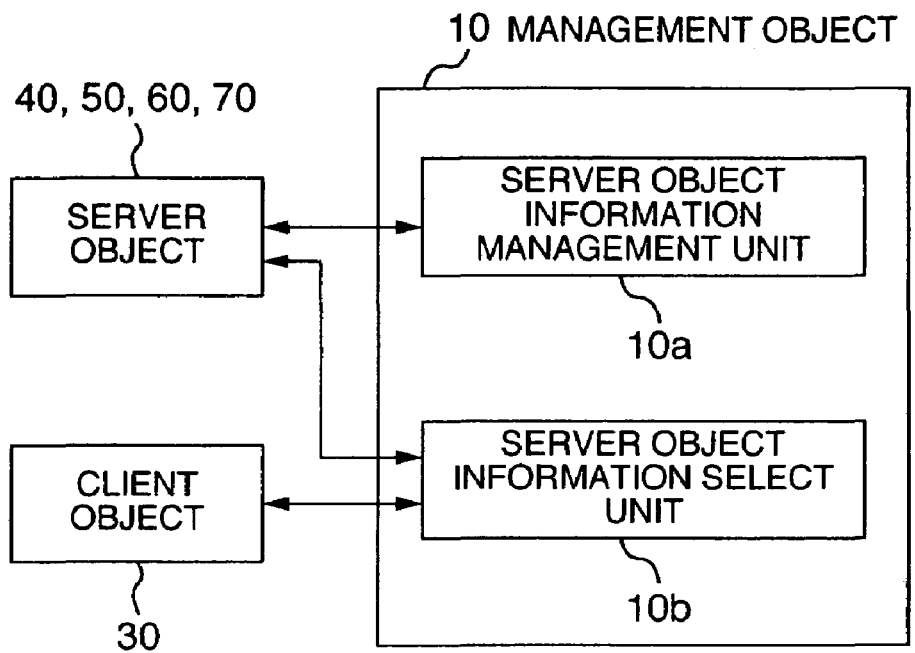
FIG. 2 is a diagram showing an example of configuration of a management object 10 according to an embodiment of the invention.

FIG. 2 is a diagram showing an example of configuration of the management object 10 according to an embodiment. As shown in FIG. 2, the management object 10 according to this embodiment includes a server object information management unit 10a and a server object information select unit 10b.

The server object information management unit 10a processes the registration requests from the server objects and manages the server object information of each server object. The server object information select unit 10b performs the process of selecting and supplying the requester with the server object information of the newest one of the server objects requested from the client object or the server object, and in the case where the requester is a server object, carries out the process for selecting and supplying the requester with the server object information of the server object having the change information concurrent with or older than the requester server object.

The program for causing the management object 10 to function as the server object information management unit 10a and the server object information select unit 10b is recorded in a recording medium such as a CD-ROM and stored in a magnetic disk or the like, after which it is loaded in a memory and executed. The recording medium for recording the program may be other than the CD-ROM.

Figure 3:
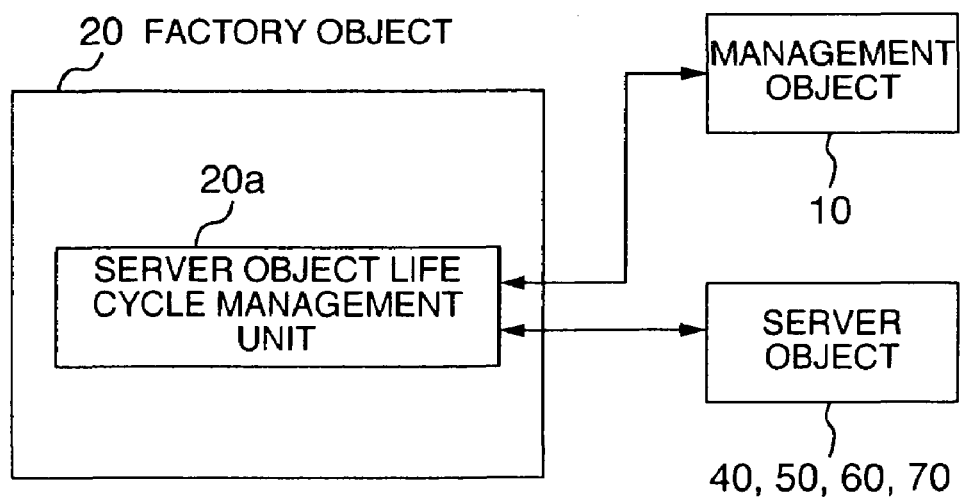
FIG. 3 is a diagram showing an example of configuration of a factory object 20 according to an embodiment of the invention.

FIG. 3 is a diagram showing an example of configuration of the factory object 20 according to an embodiment. As shown in FIG. 3, the factory object 20 according to this embodiment includes a server object life cycle management unit 20a. The server object life cycle management unit 20a is a processing unit for controlling the start and stop of the server objects, and in the presence of a plurality of server objects having the same ID information indicating the name of the server object and the interface, stopping the server objects having the old change information.

The program for causing the factory object 20 to function as the server object life cycle management unit 20a is recorded in a recording medium such as a CD-ROM and stored in a magnetic disk or the like, after which it is loaded in a memory and executed. The recording medium for recording this program may be other than the CD-ROM.

Figure 4:
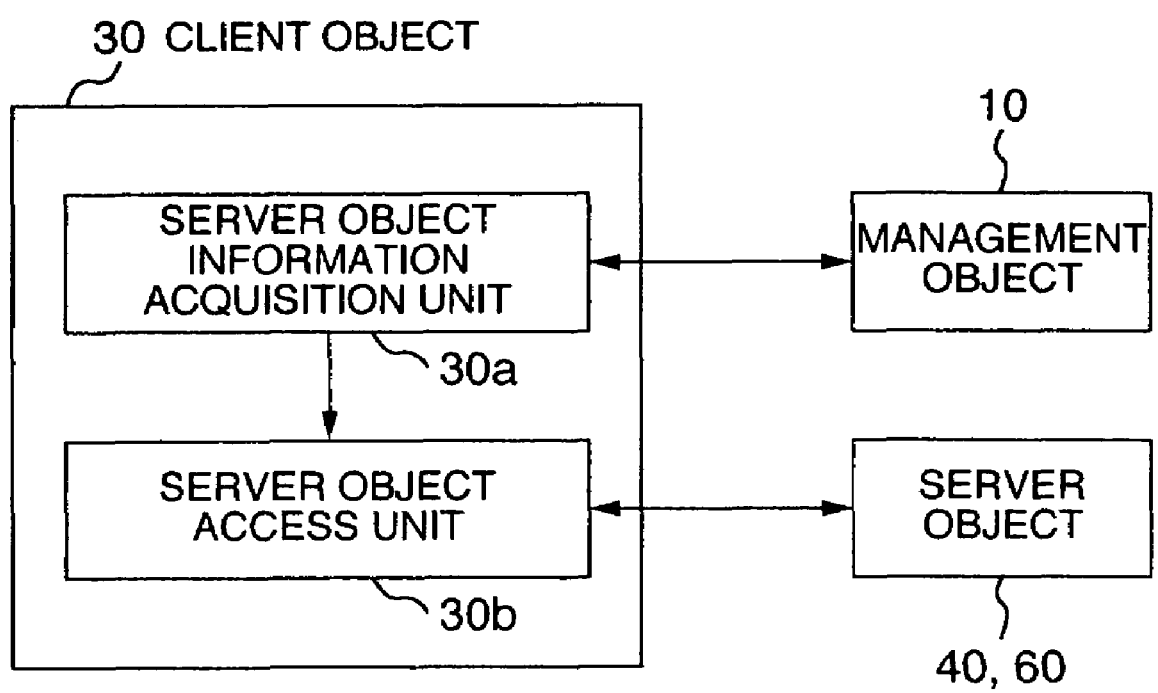
FIG. 4 is a diagram showing an example of configuration of a client object 30 according to an embodiment of the invention.

FIG. 4 is a diagram showing an example of configuration of the client object 30 according to an embodiment. As shown in FIG. 4, the client object 30 according to this embodiment includes a server object information acquisition unit 30a and a server object access unit 30b.

The server object information acquisition unit 30a is a processing unit for requesting the management object 10 to supply the server object information of the server object to be accessed. The server object access unit 30b is a processing unit for accessing the server object indicated in the server object information acquired from the management object 10.

The program for causing the client object 30 to function as the server object information acquisition unit 30a and the server object access unit 30b is recorded in a recording medium such as a CD-ROM and stored in a magnetic disk or the like, after which it is loaded in a memory and executed. The recording medium for recording the program may be other than the CD-ROM.

Figure 5:
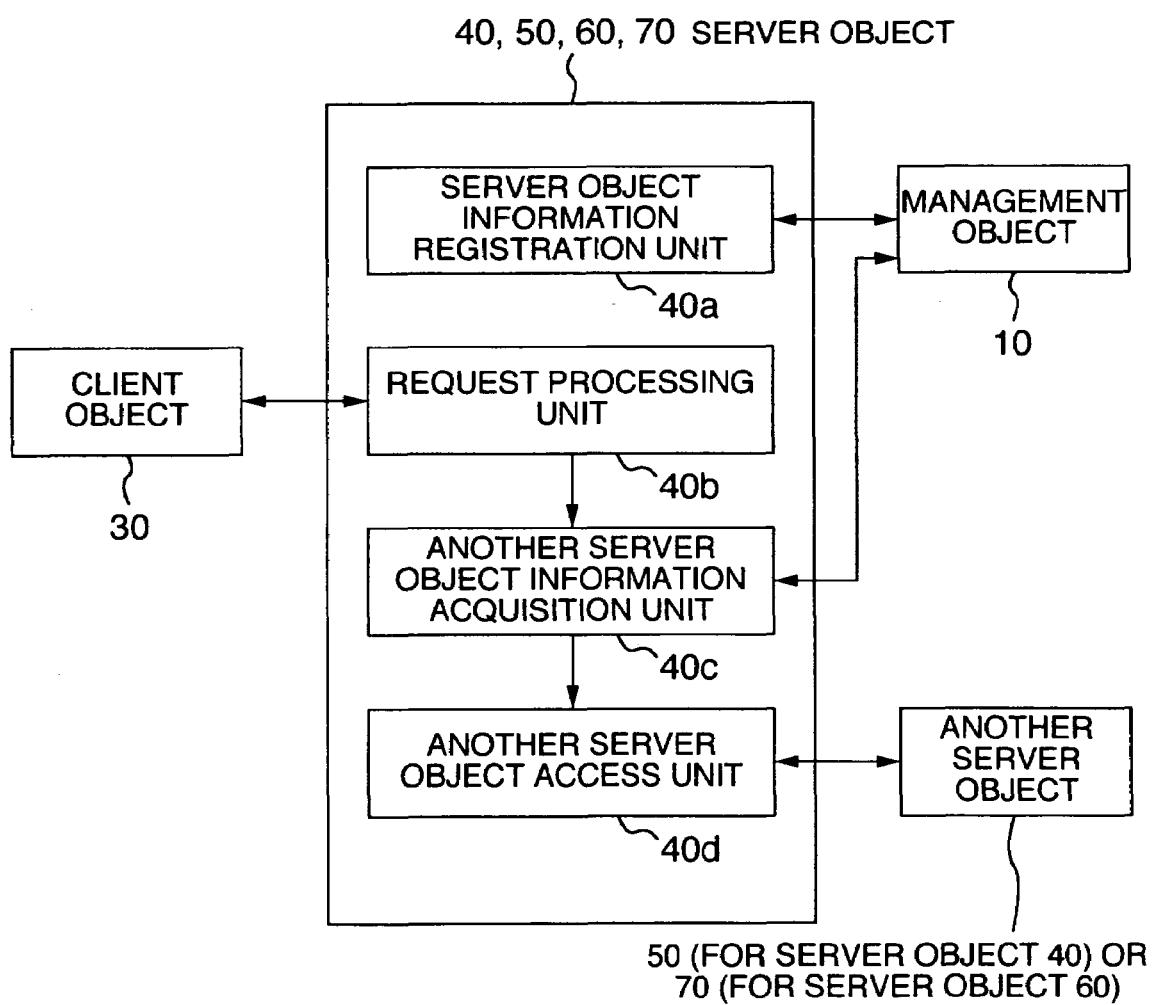
FIG. 5 is a diagram showing an example of configuration of a server object according to an embodiment of the invention.

FIG. 5 is a diagram showing an example of configuration of a server object according to an embodiment. As shown in FIG. 5, the server object according to this embodiment includes a server object information registration unit 40a, a request processing unit 40b, another server object information acquisition unit 40c and another server object access unit 40d.

The server object information registration unit 40a is a processing unit for requesting the management object 10 to register a server object and sending the revision information indicating the newness of the particular server object as change information to the management object 10.

The request processing unit 40b is a processing unit for performing the process requested by the access from a client object or a server object. Another server object information acquisition unit 40c is a processing unit for inquiring of the management object 10 as to another server object which may be accessed by the server object. Another server object access unit 40d is a processing unit for accessing the another server object indicated in the server object information acquired from the management object 10.

The program for causing the server object to function as the server object information registration unit 40a, the request processing unit 40b, another server object information acquisition unit 40c and another server object access unit 40d is recorded in a recording medium such as the CD-ROM and stored in a magnetic disk or the like, after which it is loaded in a memory and executed. The recording medium for recording the program mentioned above may be other than the CD-ROM.

Figure 6:
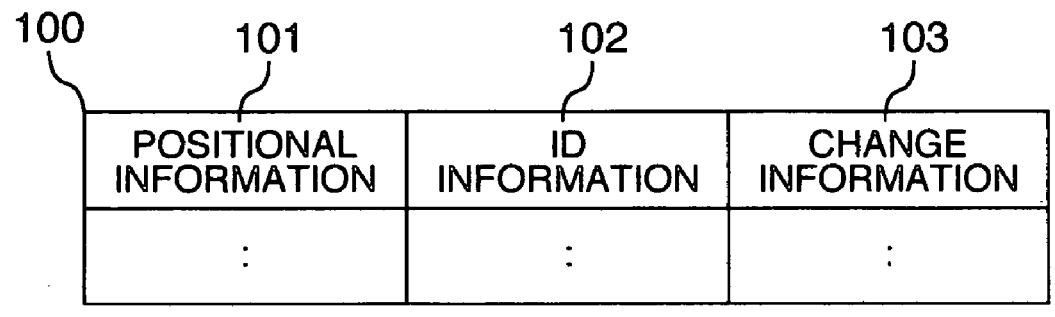
FIG. 6 is a diagram showing an example of configuration of the server object registration information used by the management object 10 in a server object information management unit 10a and a server object information select unit 10b.

FIG. 6 is a diagram showing an example of configuration of the server object registration information used by the management object 10 in the server object information management unit 10a and the server object information select unit 10b according to this embodiment. As shown in FIG. 6, the server object registration information 100 of the management object 10 is configured with positional information 101 for storing the position of the server object, ID information 102 for storing the name of the server object and the interface information, and change information 103 for storing the information for recognizing the change of the server object.

The server object information management unit 10a of the management object 10, if supplied with the change information indicating the revision of a server object from the particular server object, registers the particular revision information in the change information 103, while in the case where the change information is not supplied to the server object information management unit 10a from the server object, registers in the change information 103 a flag indicating that the change information is not sent and the present time of registration of the particular server object.

Figure 7:
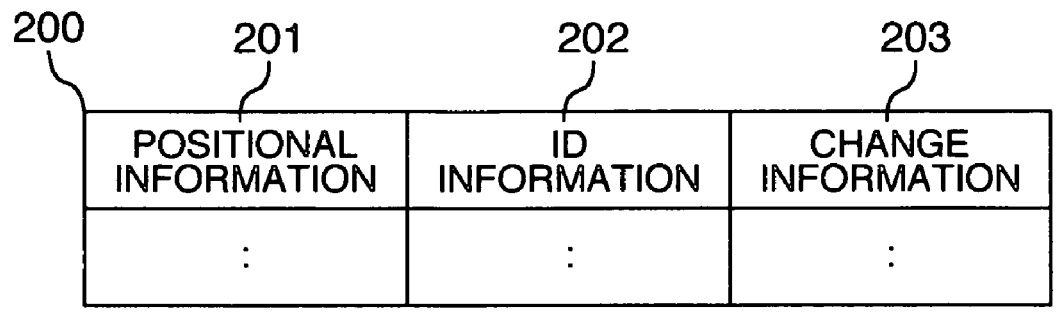
FIG. 7 is a diagram showing an example of configuration of the server object management information used in the server object life cycle management unit 20a of the factory object 20 according to an embodiment of the invention.

FIG. 7 is a diagram showing an example of configuration of the server object management information used in the server object life cycle management unit 20a of the factory object 20 according to an embodiment. As shown in FIG. 7, the server object management information 200 of the factory object 20 is configured with positional information 201 for storing the position of the server object, ID information 202 for storing the name of the server object and the interface information, and change information 203 for storing information for recognizing the change in the server object.

Figure 8:
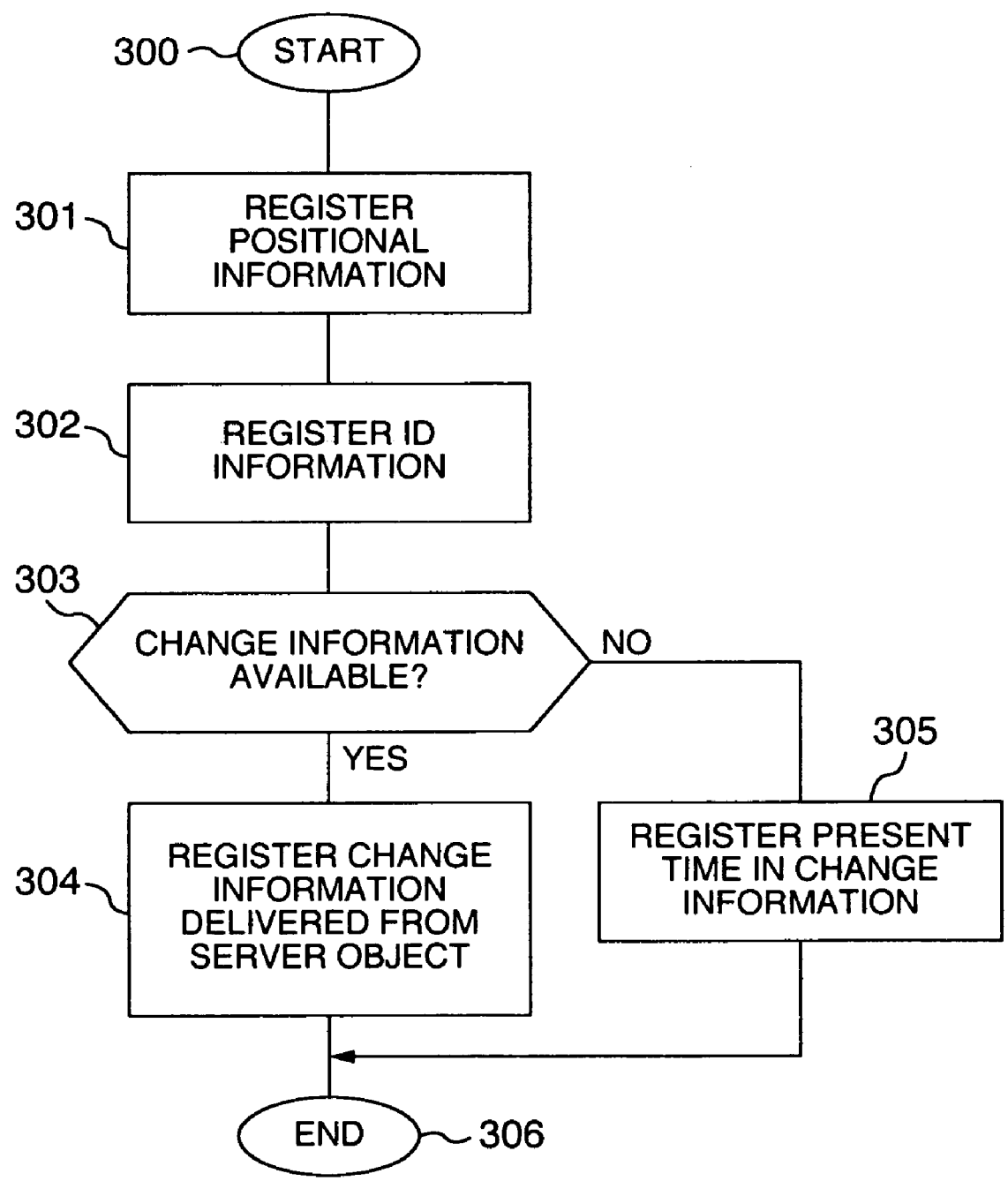
FIG. 8 is a flowchart showing the steps of the process in the server information management unit 10a of the management object 10 according to an embodiment of the invention.

FIG. 8 is a flowchart showing the steps of the processing in the server object information management unit 10a of the management object 10 according to this embodiment. Now, the registration process (41, 51, 61, 62) of the server objects (40, 50, 60, 70) by the server object information management unit 10a of the management object 10 according to the embodiment configured as described above will be explained with reference to the flowchart of FIG. 8. First, the information on the position of the server object is stored in the positional information 101, and the name of the server object and the information on the interface are stored in the ID information 102 (steps 301, 302).

Step 303 determines whether the change information 52 or 72 has been delivered or not from the server object, and in the case where the change information 52 or 72 has been so delivered, the change information 52 or 72, as the case may be, is stored in the change information 103 (step 304), while in the case where the change information 52 or 72 is not so delivered, on the other hand, a flag indicating that the change information is not delivered and the present time are stored (step 305).

Figure 9:
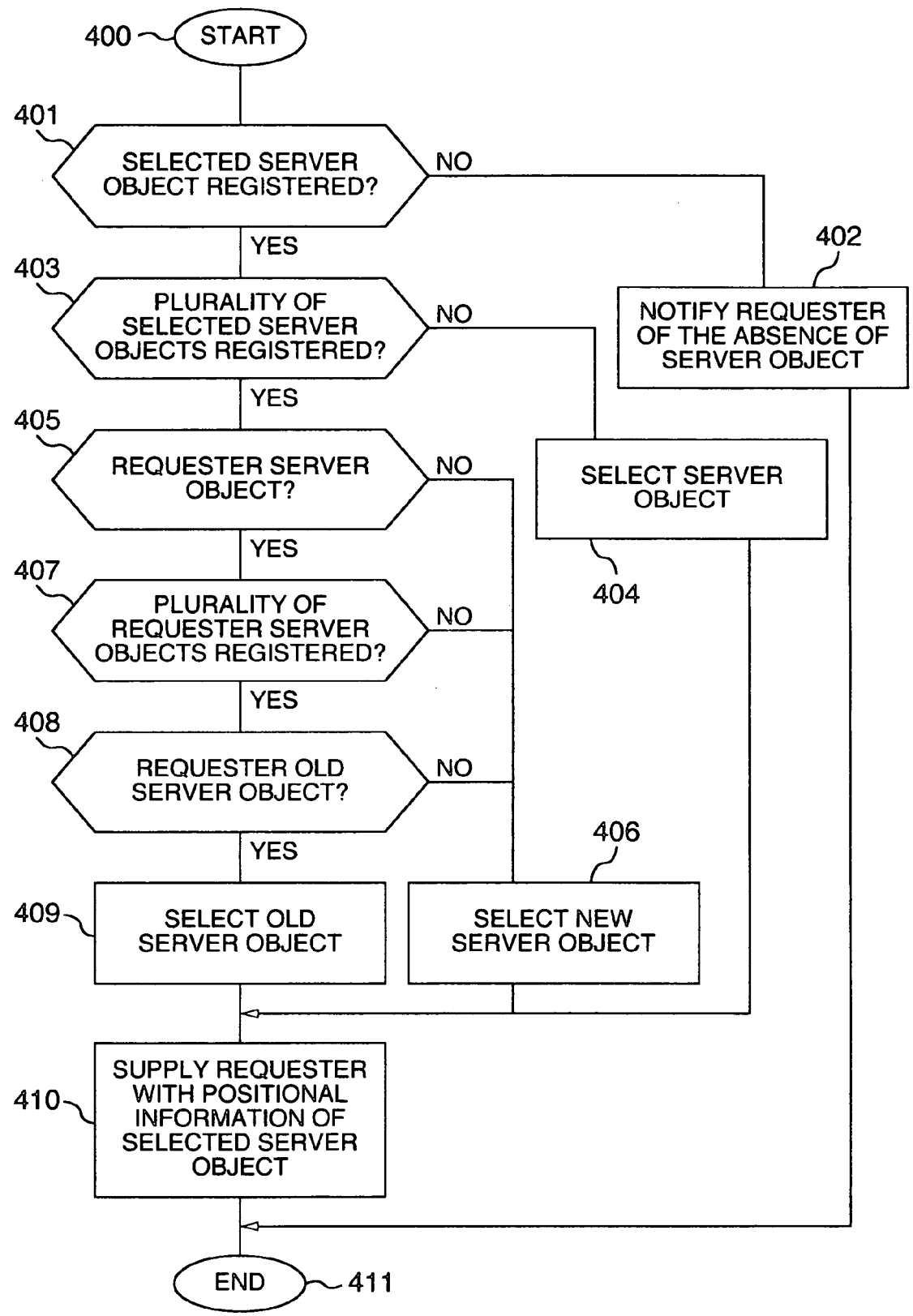
FIG. 9 is a flowchart showing the steps of the process in the server object information select unit 10b of the management object 10 according to an embodiment of the invention.

FIG. 9 is a flowchart showing the steps of the processing in the server object information select unit 10b of the management object 10 according to an embodiment of the invention. Now, the process (31, 42, 62) for selecting the server objects (40, 50, 60, 70) by the server object information select unit 10b of the management object 10 according to the embodiment configured as described above will be explained with reference to the flowchart of FIG. 9.

First, step 401 retrieves the ID information 102 of the server object registration information 100 from the server object information delivered from the requester, and in the case where the selected server object is not registered, absence of a registered server object is notified to the requester (step 402).

Step 403 determines whether a plurality of the selected server objects are registered or not, and in the case where a plurality of them are not registered, the positional information 101 of the single server object in registration is selected and supplied to the requester (steps 404, 410).

Step 405 determines whether the requester is also registered as a server object or not, and in the case where it is not so registered, the positional information 101 of the server object having new change information 103 is selected and supplied to the requester (steps 406, 410). In the case where the revision information is registered in all the change information 103 of the server objects to be selected, the server object having the newest revision information is selected. In the case where the revision information is registered in some of the change information 103 of the server objects to be selected and a flag indicating that no change information is sent is registered in other change information 103, the server object having the newest revision information is selected from those with the change information in which the revision information is registered, while in the case where the flag indicating that the change information is not sent is registered in all the change information 103 of the server objects to be selected, the time information in the change information 103 selects the newest server object.

Step 407 determines whether there exists any server object having the same ID information 102 as the requester server object, and in the case where there is no other server object having the same ID information, the positional information 101 of the new server object having the same ID information 103 is selected and supplied to the requester (steps 406, 410).

By referring to the change information 103 of a server object having the same ID information 102 as the change information 103 of the requester server object, step 408 determines whether the particular server object is new or not, and in the case where it is new, the positional information 101 of a server object having the new change information 103 is selected and supplied to the requester (steps 406, 410). In the case where the server object is old, on the other hand, the positional information 101 of a server object having the old change information 103 is selected and supplied to the requester (steps 409, 410).

Figure 10:
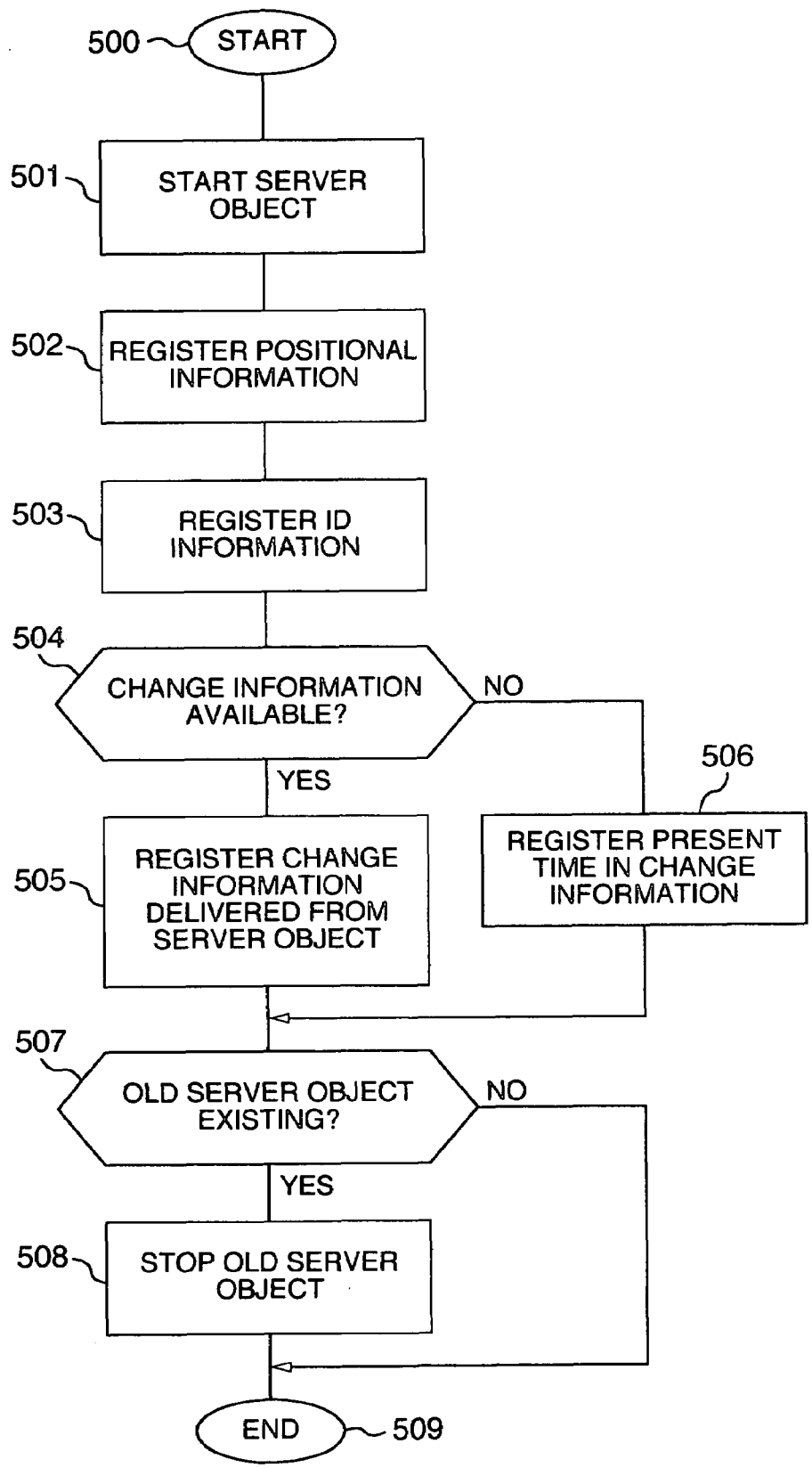
FIG. 10 is a flowchart showing the steps of the process in the server object life cycle management unit 20a of the factory object 20 according to an embodiment of the invention.

FIG. 10 is a flowchart showing the steps of the process performed in the server object life cycle management unit 20a of the factory object 20 according to an embodiment of this invention. Now, in this embodiment configured as described above, the start process (22, 23, 24, 25) and the stop process (26, 27) of the server object (40, 50, 60, 70) performed by the server object life cycle management unit 20a of the factory object 20 will be explained with reference to the flowchart of FIG. 10.

First, the server object life cycle management unit 20a of the factory object 20 starts the server objects in the order reverse to the predefined order of access to the server objects, so that the information on the position of the server objects is stored in the positional information 201 and the names of the server objects and the information on the interfaces are stored in the ID information 202 (steps 501 to 503).

Step 504 determines whether the change information 52 or 57 is delivered from a server object or not, and in the case where it is delivered so, the particular change information 52 or 57 is stored in the change information 203 (step 505), while in the case where the change information 52 or 57 is not so delivered, on the other hand, a flag indicating that the change information is not delivered and the present time are stored (step 506).

In the case where step 507 determines that a plurality of server objects (40, 60; 50, 70) have the same ID information 202, the change information 203 thereof are compared with each other. Any object (40, 50) of which the change information 203 is found to be old is stopped (step 508). In the process, as soon as the process under execution and having the old object (40, 50) is completed, the server object life cycle management unit 20a of the factory object 20 stops the old objects (40, 50) in the order reverse to the predefined order of access.

As described above, in the distributed system according to this embodiment, the information that can be determined by the management object and the factory object is held as change information, and according to the difference between these change information, the change of a server object is identified, thereby making it possible to change an object in operation.

It will be understood from the foregoing description that with the distributed object management system according to this embodiment, the server object information of the newest server object is supplied to the requester and the newest server object is accessed in the case where the server object information is requested. In this way, the server object accessed is changed from the old to the newest one, and therefore the server object can be changed in operation.

According to this invention, in the case where the server object information is requested, the server object information of the newest server object is supplied to the requester thereby to access the newest server object. In this way, the server object accessed can be changed from the old to the newest one, and therefore the server object can be changed in operation.

The invention claimed is:

1. A distributed object management method for managing objects in a distributed object environment, comprising the steps of:
   requesting, by a client object, server object information from a management object of server objects to be accessed;
   selecting and supplying a requester with server object information of a newest server object of requested server objects based on a change information including a revision information showing a newness of each said requested server object, the selecting and supplying being performed by the management object;
   accessing said newest server object indicated in the server object information supplied; and
   performing processing requested by said access,
   wherein a newest revision of the accessed server object, if it exists, is accessible in response to a request while the performing processing requested continues.

2. A distributed object management method according to claim 1, further comprising the steps of:
   in a case where the requester is a server object to be accessed during said accessing step, selecting and supplying, to the requester, the server object information of another server object to be accessed from said server object, in accordance with said change information for the requester server object.

3. A distributed object management method according to claim 2, further comprising the steps of:
   in a case where there are a plurality of server objects having a same server object name or same interface identification information, stopping server objects having old change information including old version information.

4. A distributed object management system for managing objects in a distributed object environment, comprising:
   a server object information acquisition unit for requesting server object information of a server object to be accessed;
   a server object information selection unit for selecting and supplying a requester with server object information of a newest server object of requested server objects based on a change information including revision information showing a newness of each said requested server objects;
   a server object access unit for accessing a server object indicated in said server object information supplied; and
   a request processing unit for performing processing requested by said access,
   wherein a newest revision of the accessed server object, if it exists, is accessible in response to a request while the performing processing requested continues.

5. A computer readable recording medium having recorded thereon a program for causing a computer to function as a distributed object management system for managing objects in a distributed object environment, comprising:
   a server object information acquisition unit for requesting server object information of server objects to be accessed;
   a server object information select unit for selecting and supplying a requester with server object information of a newest server object of requested server objects based on a change information including revision information showing a newness of each said requested server objects;
   a server object access unit for accessing a server object indicated in said server object information supplied; and
   a request processing unit for performing processing requested by said access,
   wherein a newest revision of the accessed server object, if it exists, is accessible in response to a request while the performing processing requested continues.

* * * * *